United States Patent
Kanza et al.

(10) Patent No.: US 11,536,842 B2
(45) Date of Patent: Dec. 27, 2022

(54) CONSTRUCTING COMPACT THREE-DIMENSIONAL BUILDING MODELS

(71) Applicant: AT&T Intellectual Property I, L.P., Atlanta, GA (US)

(72) Inventors: Yaron Kanza, Fair Lawn, NJ (US); Philip Brown, Westfield, NJ (US); Velin Kounev, Weehawken, NJ (US); Arun Jotshi, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 566 days.

(21) Appl. No.: 16/660,260

(22) Filed: Oct. 22, 2019

(65) Prior Publication Data

US 2021/0116568 A1 Apr. 22, 2021

(51) Int. Cl.
*G01C 11/04* (2006.01)
*G01S 17/89* (2020.01)
*G01S 17/42* (2006.01)
*G06V 20/64* (2022.01)
*G06V 20/10* (2022.01)

(52) U.S. Cl.
CPC .............. *G01S 17/89* (2013.01); *G01S 17/42* (2013.01); *G06V 20/176* (2022.01); *G06V 20/64* (2022.01)

(58) Field of Classification Search
CPC ......... G01S 17/89; G01S 17/42; G06V 20/64; G06V 20/176; G01C 21/005; G06T 17/05
See application file for complete search history.

(56) References Cited

U.S. PATENT DOCUMENTS

2017/0301104 A1* 10/2017 Qian ................... G01C 21/005
2019/0066372 A1* 2/2019 Falk-Wallace .......... G06T 17/05

OTHER PUBLICATIONS

Li et al., Semantic Segmentation-Based Building Footprint Extraction Using Very High-Resolution Satellite Images and Multi-Source GIS Data Feb. 16, 2019, MDPI, vol. 11, p. 1-2, DOI: 10.3390/rs11040403.*

Brown, Philip E., et al., "Height and Facet Extraction from LiDAR Point Cloud for Automatic Creation of 3D Building Models," SIGSPATIAL '19: Proceedings of the 27th ACM SIGSPATIAL International Conference on Advances in Geographic Information Systems, Nov. 2019, pp. 596-599, https://doi.org/10.1145/3347146.3359372.

(Continued)

*Primary Examiner* — Abdul-Samad A Adediran

(57) ABSTRACT

An example method performed by a processing system includes obtaining a light detecting and ranging point cloud of a building, where the point cloud includes a plurality of points, and where each point is associated with a set of (x,y,z) coordinates. A first point of the plurality of points is assigned to a subset of the plurality of points that is associated with the building, where the subset includes points whose (x,y) coordinates fall within a footprint of the building. The first point is grouped into a first cluster according to at least one of: a (z) coordinate of the first point and a gradient to which the first point belongs. A first prism formed by the first cluster is constructed. A model of the building is stored as a plurality of connected prisms, where the plurality of connected prisms includes the first prism.

20 Claims, 7 Drawing Sheets

(56) References Cited

OTHER PUBLICATIONS

Fernandez, J. C., A. Singhania, J. Caceres, K. C. Slatton, M. Starek, and R. Kumar. "An overview of lidar point cloud processing software." GEM Center Report No. Rep_2007-12-001, University of Florida (2007).

Catriel Beeri, Yaron Kanza, Eliyahu Safra, and Yehoshua Sagiv. 2004. Object Fusion in Geographic Information Systems. In Proceedings of the [irtieth International Conference on Very Large Data Bases—vol. 30 (VLDB '04). VLDB Endowment, 816-827.

Tamrapami Dasu, Yaron Kanza, and Divesh Srivastava. 2018. Geofences in the Sky: Herding Drones with Blockchains and 5G. In Proc. of the 26th ACM SIGSPATIAL International Conf. on Advances in Geographic Information Systems.

Pascal Kaiser, Jan DirkWegner, Aur'elien Lucchi, Martin Jaggi, Thomas Hofmann,and Konrad Schindler. 2017. Learning aerial image segmentation from online maps. IEEE Transactions on Geoscience and Remote Sensing 55, 11 (2017).

Franz Rottensteiner. 2003. Automatic generation of high-quality building models from LiDAR data. IEEE Computer Graphics and Applications 23, 6 (2003), 42-50.

Aparajithan Sampath and Jie Shan. 2009. Segmentation and reconstruction of polyhedral building roofs from aerial LiDAR point clouds. IEEE Transactions on geoscience and remote sensing 48, 3 (2009), 1554-1567.

Mansoor Shafi, Andreas F Molisch, Peter J Smith, Thomas Haustein, Peiying Zhu, Prasan De Silva, Fredrik Tufvesson, Anass Benjebbour, and Gerhard Wunder. 2017. 5G: A tutorial overview of standards, trials, challenges, deployment, and practice. IEEE journal on selected areas in communications 35, 6 (2017), 1201-1221.

Shaohui Sun and Carl Salvaggio. 2013. Aerial 3D building detection and modeling from airborne LiDAR point clouds. IEEE Journal of Selected Topics in Applied Earth Observations and Remote Sensing 6, 3 (2013), 1440-1449.

Baszczak-Bąk, Wioleta. "New optimum dataset method in LiDAR processing." Acta geodynamica et geomaterialia 13, No. 4 (2016): 184.

Ruisheng Wang, Jiju Peethambaran, and Dong Chen. 2018. LiDAR Point Clouds to 3-D Urban Models : A Review. IEEE Journal of Selected Topics in Applied Earth Observations and Remote Sensing 11, 2 (2018), 606-627.

Cheng Yi, Yuan Zhang, Qiaoyun Wu, Yabin Xu, Oussama Remil, Mingqiang Wei, and Jun Wang. 2017. Urban building reconstruction from raw LiDAR point data. Computer-Aided Design 93 (2017), 1-14.

Gupta, Akhil, and Rakesh Kumar Jha. "A survey of 5G network: Architecture and emerging technologies." IEEE access 3(2015): 1206-1232.

* cited by examiner

700

CONSTRUCTING COMPACT THREE-DIMENSIONAL BUILDING MODELS

The present disclosure relates generally to cellular network planning, and relates more particularly to devices, non-transitory computer-readable media, and methods for automatically constructing compact three-dimensional building models.

BACKGROUND

Effective urban planning often relies on the creation of three-dimensional (3D) models of buildings and vegetation. For instance, when power lines are being deployed in an area, the deployment should consider the locations and heights of any nearby buildings when determining where to place the power lines. Similarly, when installing solar panels of the roof of a building, the positions of the solar panels should consider any areas of shade that may be cast by taller buildings, by trees, and the like.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
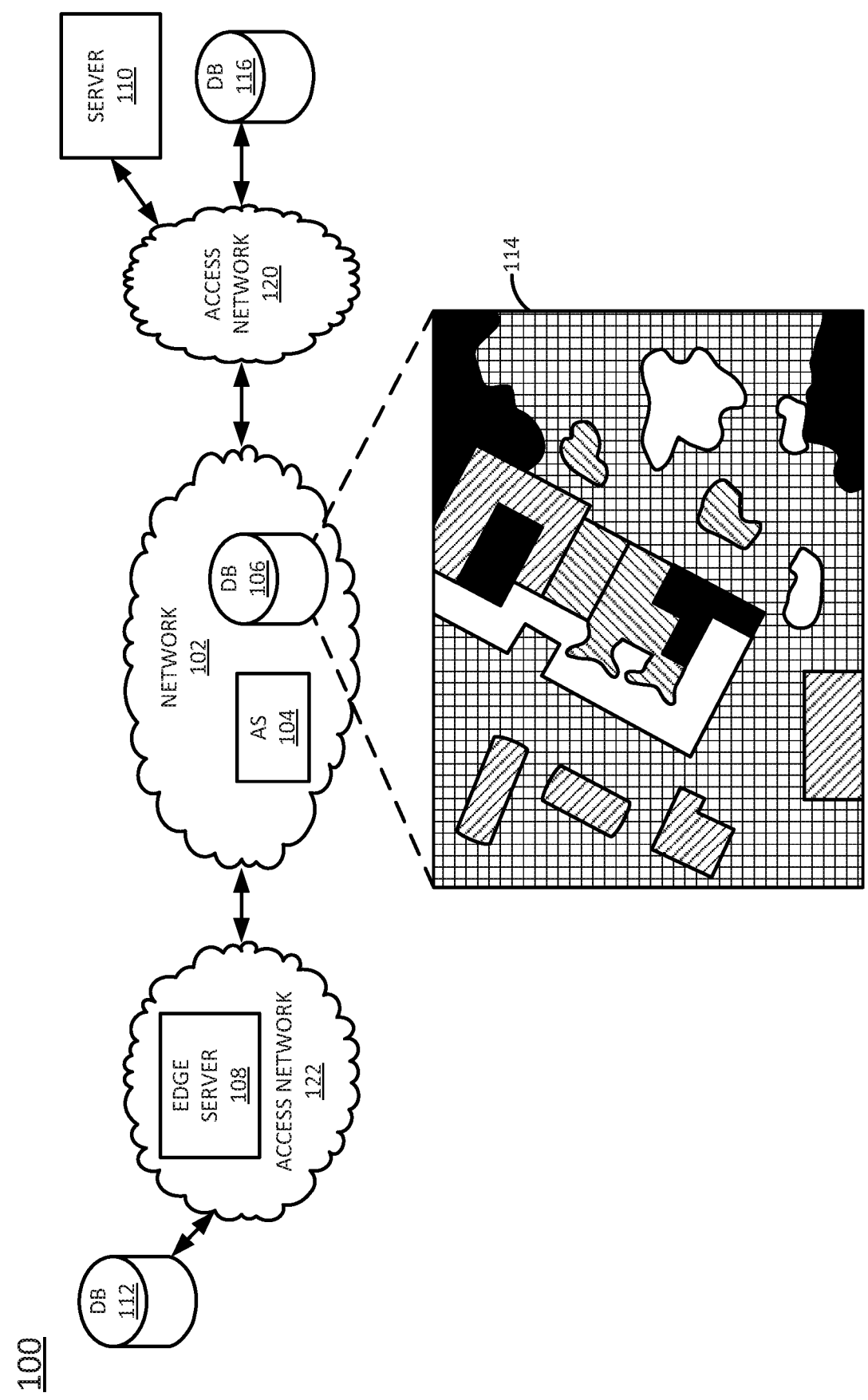
FIG. 1 illustrates an example network related to the present disclosure.

In one example, the present disclosure describes a device, computer-readable medium, and method for automatically constructing compact three-dimensional building models. For instance, in one example, a method performed by a processing system including at least one processor includes obtaining a light detecting and ranging point cloud of a building, wherein the point cloud comprises a plurality of points, and wherein each point in the plurality of points is associated with a set of (x,y,z) coordinates, assigning a first point of the plurality of points to a subset of the plurality of points that is associated with the building, wherein the subset comprises points whose (x,y) coordinates fall within a footprint of the building, grouping, by the processing system, the first point into a first cluster according to at least one of: a (z) coordinate of the first point and a gradient to which the first point belongs, constructing a first prism formed by the first cluster, and storing a model of the building as a plurality of connected prisms, wherein the plurality of connected prisms includes the first prism.

In another example, a device includes a processor and a computer-readable medium storing instructions which, when executed by the processor, cause the processor to perform operations. The operations include obtaining a light detecting and ranging point cloud of a building, wherein the point cloud comprises a plurality of points, and wherein each point in the plurality of points is associated with a set of (x,y,z) coordinates, assigning a first point of the plurality of points to a subset of the plurality of points that is associated with the building, wherein the subset comprises points whose (x,y) coordinates fall within a footprint of the building, grouping, by the processing system, the first point into a first cluster according to at least one of: a (z) coordinate of the first point and a gradient to which the first point belongs, constructing a first prism formed by the first cluster, and storing a model of the building as a plurality of connected prisms, wherein the plurality of connected prisms includes the first prism.

In another example, a non-transitory computer-readable medium stores instructions which, when executed by a processing system including at least one processor, cause the processing system to perform operations. The operations include obtaining a light detecting and ranging point cloud of a building, wherein the point cloud comprises a plurality of points, and wherein each point in the plurality of points is associated with a set of (x,y,z) coordinates, assigning a first point of the plurality of points to a subset of the plurality of points that is associated with the building, wherein the subset comprises points whose (x,y) coordinates fall within a footprint of the building, grouping, by the processing system, the first point into a first cluster according to at least one of: a (z) coordinate of the first point and a gradient to which the first point belongs, constructing a first prism formed by the first cluster, and storing a model of the building as a plurality of connected prisms, wherein the plurality of connected prisms includes the first prism.

As discussed above, effective urban planning often relies on the creation of 3D models of buildings and vegetation. Planning a cellular network infrastructure, for instance, may require detailed, accurate knowledge of the buildings in an area. For example, fifth generation (5G) cellular networks utilize high-frequency millimeter waves which significantly increase network speed, but only work at a short range, and may be easily blocked by buildings, trees, and other obstructions. Thus, access to accurate models of buildings in the deployment area may help the cellular network service provider to determine the optimal number and placement of cellular antennas to deploy for high coverage at a minimal cost.

When performing traditional 3D modeling at a large scale, as might be done when planning a 5G infrastructure for a large city or even for an entire nation, the area of each building is initially extracted from satellite images (e.g., using a machine learning segmentation algorithm or a similar process). Subsequently, the height of each building is computed based on a light detection and ranging (LiDAR) point cloud, i.e., a high-density grid of points, where each point in the grid associates a set of coordinates with a surface height above sea level.

Collectively, the grid of points in a point cloud provides a digital surface model (DSM) that represents the heights of buildings, vegetation, and other objects on the Earth's surface. However, using a point cloud in its raw form for building height estimation presents challenges. For one, a single building may be represented by thousands of points; thus, to store the data (e.g., point coordinates) for even one building may consume a great deal of memory. Moreover, the size of the data may lead to a strain on computational resources as well (e.g., when performing calculations for line-of-sight, viewsheds, shade casting, and the like). Another challenge relates to the computation of electromagnetic wave reflection from roofs, as these computations require knowledge of whether the roofs include large, flat surfaces, which may not be possible to determine from a point cloud. Yet another challenge relates to computations which may require integration with additional geospatial and non-geospatial data which may be needed by urban planners and cellular network engineers, such as building usage, building materials, and/or other data.

Examples of the present disclosure provide a scalable approach to using LiDAR point clouds to identify building height and facets. As discussed above, it is important to accurately determine the heights of buildings when planning cellular network infrastructures, since buildings may present obstructions to some types of cellular transmissions. In addition, it is important to detect the presence of facets in the building architectures, i.e., sloping, flat surfaces such as roofs that may reflect light and/or cellular transmissions. In some cases, a single building may include different sections having different heights and/or may include multiple different facets.

In one example, buildings and other objects may be represented by groups of connected three-dimensional polygonal shapes, e.g., prisms. Different prisms may represent different sections of a building that have different heights. Similarly, truncated prisms (i.e., prisms having slanted top surfaces) may represent facets on a building, such as roof surfaces. Since the number of prisms making up a building is expected to be significantly smaller than the number of point cloud points making up the building, this approach provides a more compact way to store 3D data of buildings and other objects.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 7:
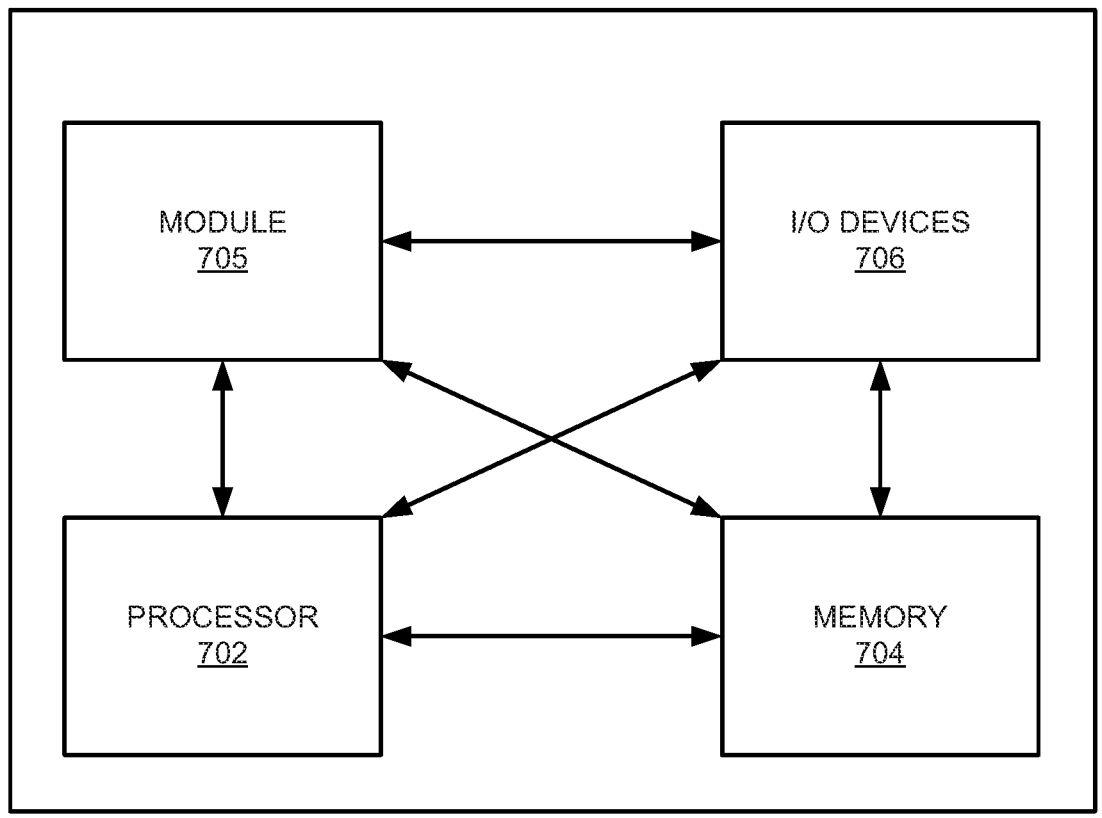
FIG. 7 illustrates a high level block diagram of a computing device specifically programmed to perform the steps, functions, blocks and/or operations described herein.

In accordance with the present disclosure, network 102 may include an application server (AS) 104, which may comprise a computing system or server, such as computing system 700 depicted in FIG. 7, and may be configured to provide one or more operations or functions in connection with examples of the present disclosure for constructing compact three-dimensional building models. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 7 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a plurality of applications or data processing modules that perform various operations on data stored in the DB 106 and/or on other data. For instance, the AS 104 may host an application that performs image processing on satellite images to extract the footprints or two-dimensional shapes of buildings and other objects (e.g., as might be viewed from above the buildings and other objects). Alternatively or in addition, the application (or another application hosted on the AS 104) may associate points of a LiDAR point cloud with building footprints that have been extracted from satellite images. The application (or another application hosted on the AS 104) may also perform clustering of points that have been associated with a building footprint, in order to identify portions of the building that can include different heights and/or facets. The application (or another application hosted on the AS 104) may also construct a three-dimensional model of a building by connecting prisms that are generated from the clustering of the points. These three-dimensional models, which comprise connected collections of prisms, may consume less storage space, and may be more efficient to process, than models comprising sets of LiDAR points.

In one example, the DB 106 may store geospatial information, such as satellite images of buildings and LiDAR point cloud images (such as point cloud image 114), and the AS 104 may retrieve the geospatial information from the DB 106 when needed. The LiDAR point cloud images may be stored in a compressed form. In one example, the DB 106 may store building footprint data instead of or in addition to the satellite images. For instance, the DB 106 may download a building footprint dataset, such as one of the United States Building Footprint datasets released by Microsoft Corporation, which contains computer-generated building footprints and, in some cases, building heights. The geospatial information may be indexed in the DB 106 for easy processing and integration with additional data sources. In a further example, the DB 106 may also store non-geospatial information, such as information about building usage (e.g., residential, commercial, industrial, or the like), building materials (e.g., whether building exteriors are mostly made up of glass, wood, brick, or the like), and other information.

In one example, the DB 106 may merge geospatial and non-geospatial information from various data sources in order to generate and maintain a list or table of known buildings. In one example, an entry for a building on the list may include, for instance, a location of the building, a footprint of the building, heights and facets of the building (which may be identified as discussed in further detail below), what the building is used for (e.g., residential, commercial, industrial, or the like) and the exterior materials of the building (e.g., wood, glass, brick, etc.). Maintaining the list may provide a reach description per each building, which may be useful for complex planning tasks including 5G infrastructure planning.

In one example, the AS 104 and DB 106 may be part of a relational database management system (RDBMS), such as a PostgreSQL RBDMS. In a further example, the RBDMS may be modular, so that it is possible to replace one instance of the RBDMS with several RDBMS instances or with a distributed system, to increase scalability. In one example, the RBDMS may include application programming interfaces (APIs) which may allow for integration with other geospatial and non-geospatial data sources, e.g., databases (DBs) 112 and/or 116. For instance, in one example, a representational state transfer (REST)ful Web services API based on the Flask web server gateway interface Web application framework may be used to support integration of the RBDMS with a Mapbox open source mapping platform tile server that presents vector tiles. In another example, a quantum geographic information system (QGIS) API may be used to facilitate unmediated visualization of the geospatial and non-geospatial data.

For ease of illustration, various additional elements of network 102 are omitted from FIG. 1.

Figure 2:
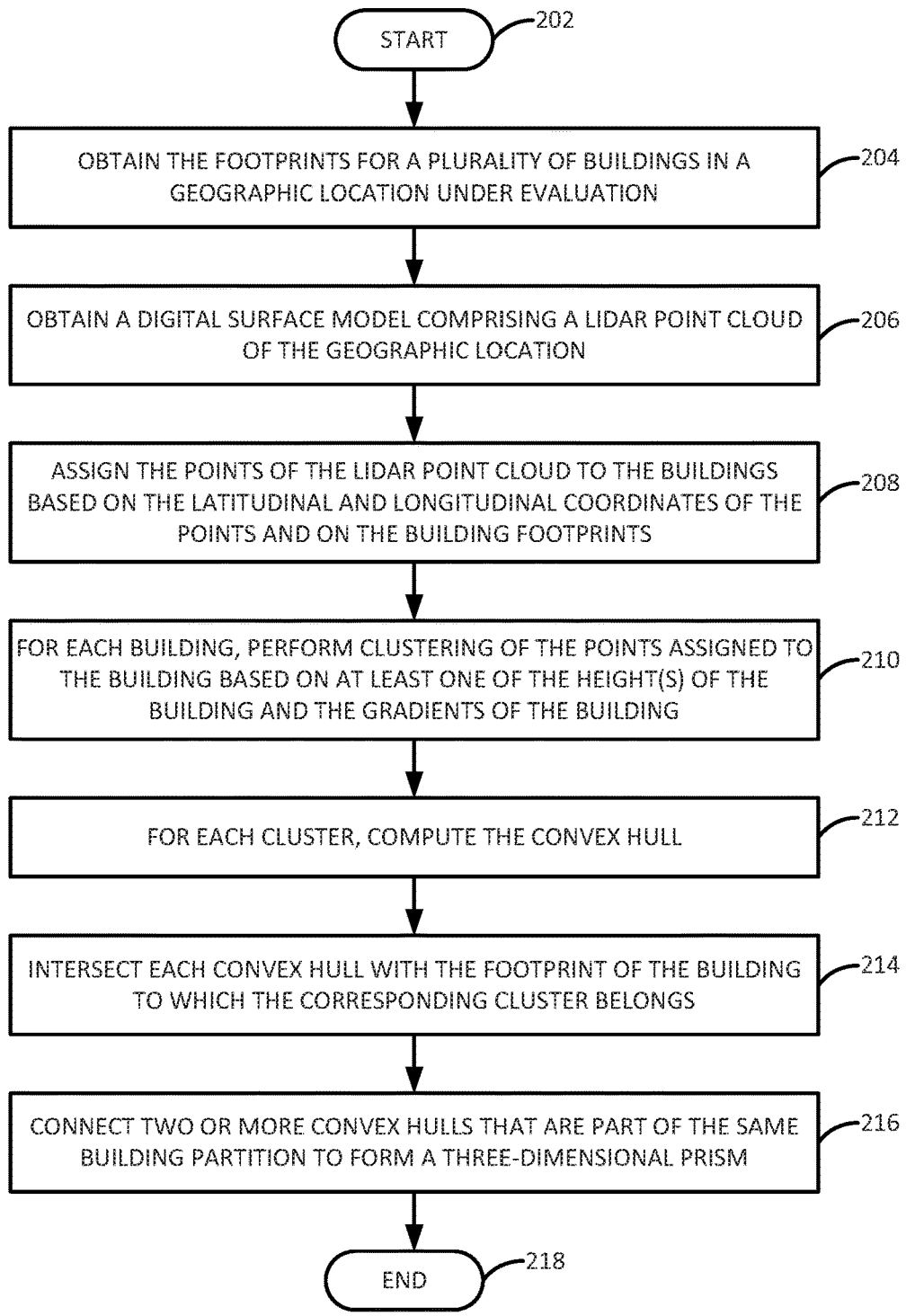
FIG. 2 illustrates a flowchart of an example method for constructing compact three-dimensional building models, in accordance with the present disclosure.

In one example, access network 122 may include an edge server 108, which may comprise a computing system or server, such as computing system 700 depicted in FIG. 7, and may be configured to provide one or more operations or functions for constructing compact three-dimensional building models, as described herein. For instance, an example method 200 for constructing compact three-dimensional models of buildings is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110 and DB 116. Similarly, access network 122 may be in communication with one or more devices or data sources, e.g., DB 112. Access networks 120 and 122 may transmit and receive communications between server 110, DBs 112 and 116, application server (AS) 104, other components of network 102, devices reachable via the Internet in general, and so forth.

In one example, server 110 may comprise a network-based server for constructing compact three-dimensional building models. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an RDBMS.

In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between DB 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, DB 112 may communicate with access network 122, network 102, the Internet in general, etc., via a WLAN that interfaces with access network 122.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 2 illustrates a flowchart of an example method 200 for constructing compact three-dimensional building models, in accordance with the present disclosure. In one example, the method 200 is performed by a component of the system 100 of FIG. 1, such as by the AS 104, and/or any one or more components thereof (e.g., a processor, or processors, performing operations stored in and loaded from a memory), or by the AS 104 in conjunction with one or more other devices, such as server 106, edge server 108, and so on. In one example, the steps, functions, or operations of method 200 may be performed by a computing device or system 700, and/or processor 702 as described in connection with FIG. 7 below. For instance, the computing device or system 700 may represent any one or more components of the system 100 of FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 700 may collectively function as a processing system. For illustrative purposes, the method 200 is described in greater detail below in connection with an example performed by a processing system.

The method 200 begins in step 202 and may proceed to step 204. In step 204, the processing system may obtain footprints for a plurality of buildings in a geographic location under evaluation, including a first building. For instance, the geographic location under evaluation may be an area (e.g., a city, a state, a nation, etc.) in which a 5G cellular network is being planned for deployment. In this case, the cellular network service provider may need to determine how many antennas to deploy in the area, as well where to deploy (or not deploy) the antennas to maximize coverage (e.g., to avoid obstructions and/or unwanted reflections of signals). The "footprint" of a building, in this context, is understood to refer to the polygon that is defined by the perimeter of the building plan (typically not including parking areas, landscapes, and other non-building facilities).

In one example, the processing system may obtain the building footprints by extracting the building footprints from satellite images of the buildings (e.g., images taken from above the buildings). For instance, the processing system may acquire the satellite images (e.g., from a database), and may use a machine learning segmentation algorithm or a similar technique in order to identify the building footprints within the satellite images. In another example, the processing system may obtain the building footprints directly from a database, e.g., where the work of extracting the footprints from satellite images has already been done. For instance, the building footprints may be downloaded from an existing dataset, such as Microsoft Corporation's United States Building Footprint dataset, or may be obtained from a database of geospatial data that may be indexed by building.

In step 206, the processing system may obtain a digital surface model of the geographic location under evaluation. In one example, the digital surface model comprises a LiDAR point cloud, i.e., three-dimensional collections of LiDAR points, where each LiDAR point comprises geo-referenced latitudinal and longitudinal (x,y) coordinates with vertical elevation (z) above sea level. The LiDAR point cloud may additionally include information such as intensity, scan angle, return information, and the like for each point. FIG. 1, for instance, illustrates an example portion of a LiDAR point cloud 114. In the example of FIG. 1, the LiDAR point cloud 114 may appear as a series of shapes in greyscale, where shading of the shapes indicates variations in the z coordinate. For example, the shading may gradually increase from a darkest shade at the lowest z coordinate to a lightest shade at the highest z coordinate. In other examples, however, the LiDAR point cloud may encode red, green, blue (RGB) values). In one example, the digital surface model may be obtained from a database.

In step 208, the processing system may assign the points of the LiDAR point cloud to the buildings whose footprints were obtained in step 204. In other words, the processing system determines, for each building, which points in the point cloud are contained in or are part of the building. In one example, the points whose latitudinal and longitudinal (x,y) coordinates fall within the footprint of a building are assigned to that building. Thus, in one example, step 208 may include assigning at least a first point of the LiDAR point cloud to the first building.

In step 210, the processing system may perform, for each building, clustering of the points assigned to the building, based on at least one of the height(s) of the building and the gradients (or slopes) of the building's surfaces. In one example, different clustering techniques may be used for height-based clustering and for gradient-based clustering. The result of step 210 may comprise a plurality of clusters, where each cluster comprises a subset of the points assigned to the building.

When performing height-based clustering, the processing system may look for consecutive (or consecutive within some predefined range) surfaces that are at the same height (e.g., same z coordinates). This allows the processing system to detect level shifts (i.e., height changes), which improves the accuracy of viewshed computations that may be performed later based on the 3D building models. One example of a method for height-based clustering is described in greater detail in connection with FIG. 3.

When performing gradient-based clustering, the processing system may look for surfaces on, for example, a slanted roof. For instance, the processing system may compute a unit vector perpendicular to the plane at each point, and may then cluster points based on the differences between their corresponding unit vectors. One example of a method for gradient-based clustering is described in greater detail in connection with FIG. 4.

In step 212, the processing system may compute, for each cluster produced in step 210, the convex hull. In one example, the convex hull may be computed by constructing a query and executing the query in an RDBMS. The result of step 212 may therefore comprise a plurality of convex hulls, where each convex hull corresponds to one cluster of the plurality of clusters. In one example, each convex hull is two-dimensional in shape (e.g., a two-dimensional polygon).

In step 214, the processing system may intersect each convex hull with the footprint of the building to which the corresponding cluster belongs.

Then, in step 216, the processing system may connect two or more convex hulls that are part of the same partition of the building (but that may reside at different elevations) to form a three-dimensional prism, where the three-dimensional prism represents the partition. Thus, the result of step 216 is a plurality of connected prisms, where at least two prisms of the plurality of prisms may have different heights. Furthermore, at least one of the prisms may comprise a truncated prism.

The method 200 may end in step 218.

Figure 6:
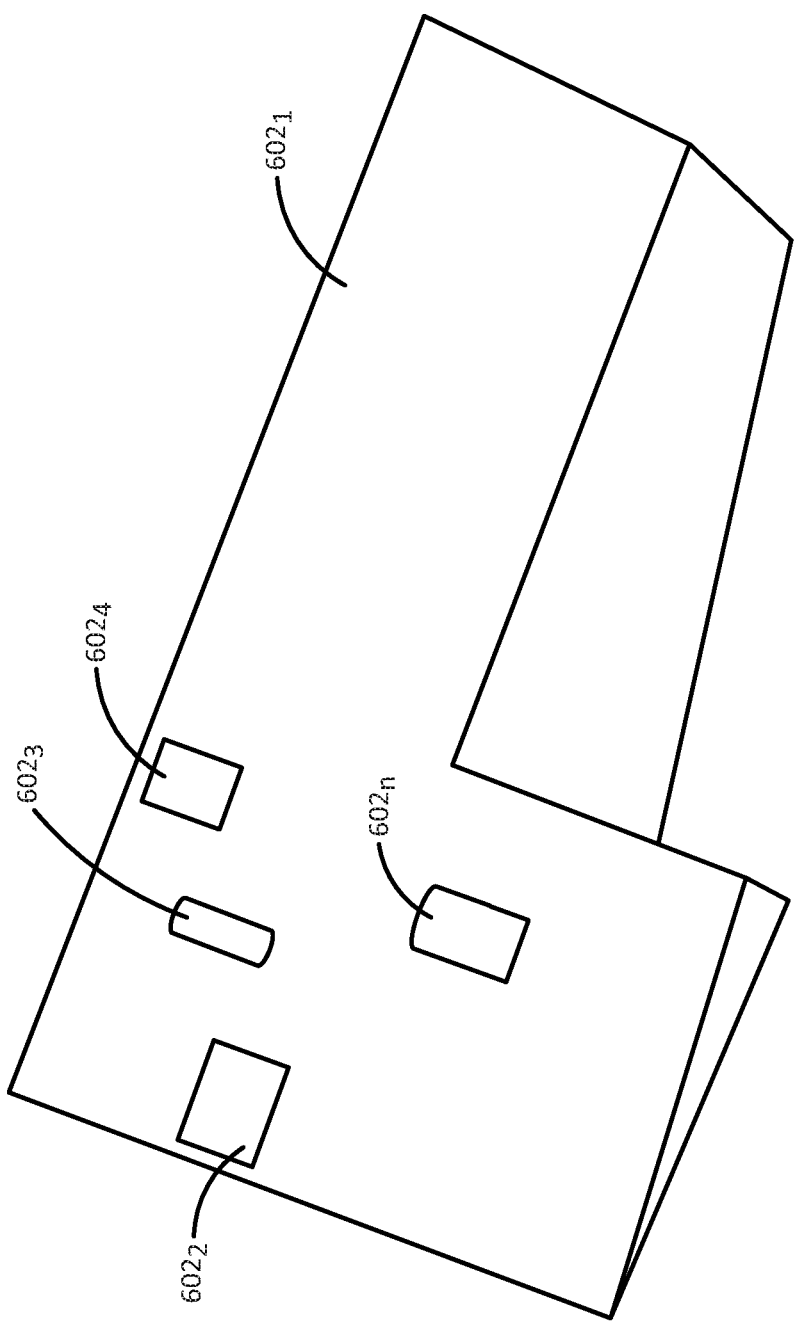
FIG. 6 illustrates an example image of a three-dimensional model of a building that may be constructed over the building's footprint, according to the method of FIG. 2.

The plurality of connected prisms that is constructed by the method 200 may form a three-dimensional model of the building. FIG. 6, for example, illustrates an example image of a three-dimensional model 600 of a building that may be constructed over the building's footprint, according to the method 200 of FIG. 2. Specifically, the example image shows a top view of the building. As illustrated, the model 600 comprises a plurality of connected prisms $602_1$-$602_n$ (hereinafter individually referred to as a "prism 602" or collectively referred to as "prisms 602"). When viewed from a top view as illustrated, the prisms 602 may appear as different partitions in the image. However, if viewed from another angle (e.g., a side view), the prisms 602 will have different heights associated with their partitions. The different prisms 602 may correspond to different sections of the building that have different heights. For instance, the largest prism $602_1$ may represent the main section of the building, which may have a single height. However, the smaller prisms $602_2$-$602_n$ may comprise objects on the roof of the building, such as air conditioning units, telecommunications equipment, and the like, which may add to the building's height.

In one example, the relative heights of various buildings with respect to the surrounding terrain may subsequently be computed using a digital elevation model (DEM). However, where a DEM is unavailable, the nearest road segment that is not covered by vegetation may be identified for each building, and this nearest road segment may be considered the height of the surrounding terrain.

Figure 3:
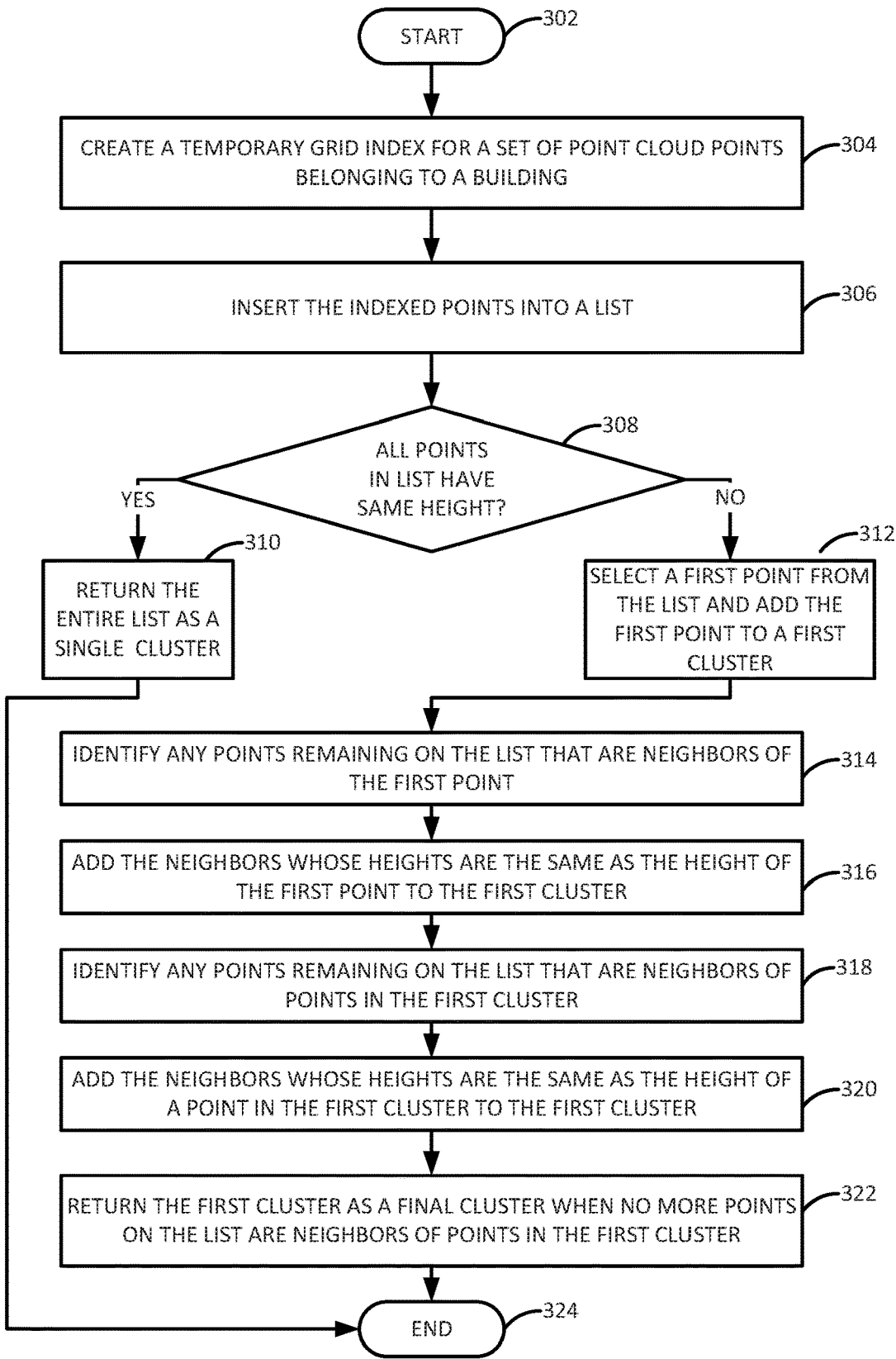
FIG. 3 illustrates a flowchart of an example method for performing height-based clustering of points of a LiDAR point cloud, in accordance with the present disclosure.

FIG. 3 illustrates a flowchart of an example method 300 for performing height-based clustering of points of a LiDAR point cloud, in accordance with the present disclosure. For instance, the method 300 may be performed in accordance with step 210 of the method 200, described above. In one example, the method 300 is performed by a component of the system 100 of FIG. 1, such as by the AS 104, and/or any one or more components thereof (e.g., a processor, or processors, performing operations stored in and loaded from a memory), or by the AS 104 in conjunction with one or more other devices, such as server 106, edge server 108, and so on. In one example, the steps, functions, or operations of method 300 may be performed by a computing device or system 700, and/or processor 702 as described in connection with FIG. 7 below. For instance, the computing device or system 700 may represent any one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 600 may collectively function as a processing system. For illustrative purposes, the method 300 is described in greater detail below in connection with an example performed by a processing system.

The method 300 begins in step 302 and may proceed to step 304. In step 304, the processing system may create a temporary grid index for a set of point cloud points belonging to a building. Within the context of a spatial index, a grid comprises a regular tessellation of a two-dimensional surface that divides the surface into a series of contiguous cells. The cells can be assigned unique identifiers and used for spatial indexing purposes The temporary grid index may be created in a single pass over the set of points to create a plurality of indexed points, and the grid index may allow the neighbors of a given point to be retrieved in constant time (i.e., with O(1) time complexity), as discussed in further detail below.

In step 306, the processing system may insert the indexed points into a list. In one example, the points may be sorted in the list according to height. For instance, the points may be listed in ascending order according to height (e.g., from a minimum height to a maximum height) or in descending order according to height (e.g., from the maximum height to the minimum height). In one example, the minimum height is the z coordinate corresponding to the lowest (in elevation) point in the list, while the maximum height is the z coordinate corresponding to the highest (in elevation) point in the list.

In step 308, the processing system may determine whether all of the points in the list have the same height. In one example, all points in the list may be considered to have the same height if the difference between the maximum height and the minimum height is below a predefined threshold. In one example, the predefined threshold may be configurable by the user. Too small a value for the predefined threshold may result in the partitioning of a building into fragments that are too small to process efficiently, whereas too large a value may not adequately distinguish between different levels of the building (e.g., may not distinguish between levels for which the difference in height is smaller than the predefined threshold). In one example, the predefined threshold is set equal to the point cloud resolution (i.e., the distance between adjacent points in the point cloud) as a default.

If the processing system determines in step 308 that all of the points in the list have the same height, then the method 300 may proceed to step 310, where the processing system may return the entire list of points as a single cluster. The method may then end in step 324.

Alternatively, if the processing system determines in step 308 that all of the points on the list do not have the same height, then the method 300 may proceed to step 312. In step 312, the processing system may select a first point from the list and add the first point to a first cluster.

In step 314, the processing system may return to the list and identify any other points remaining in the list that are neighbors of the first point. In one example, a point is a neighbor of the first point if the latitudinal and longitudinal (x,y) coordinates of the point are within a predefined threshold distance of the (x,y) coordinates of the first point. In one example, the predefined threshold distance is configurable by a user. If the predefined threshold distance is too small, then the clustering may be too sensitive too noise (e.g., clusters may end up being partitioned by small barriers or bumps). However, if the predefined threshold distance is too large, then the computational cost of the subsequent steps of the method 300 may be too great, and clusters that are too far away from each other may be inadvertently connected.

In step 316, the processing system may add those neighbors of the first point that are at the same height as (or within a predefined threshold of the height of, where the predefined threshold may be the same as the predefined threshold used in step 308) the first point to the first cluster. The points added to the cluster in step 316 may be referred to as a first set of additional points, In step 318, the processing system may return to the list and identify any other points remaining in the list that are neighbors of any points that are now in the first cluster.

In step 320, the processing system may add those neighbors of the points in the first cluster that are at the same height as (or within the predefined threshold of the height of) the points in the first cluster to the first cluster. The points added to the cluster in step 320 may be referred to as a subsequent set of additional points. In one example, steps 318 and 320 may be performed iteratively. That is, each time new points are added to the first cluster, any points remaining in the list that are neighbors of the new points may be evaluated for possible addition to the first cluster.

Once all neighbors of points in the first cluster been evaluated for inclusion in the first cluster (and either added to the first cluster if a neighbor at the same height as the point(s) in the first cluster or not added to the first cluster if not a neighbor at the same height as the point(s) in the first cluster), the processing system may return the first cluster as a final cluster in step 322.

The method 300 may then return to step 308, and repeat steps 308-320 as necessary. For instance, if all points remaining in the list now have the same height, then the list may be returned as a second (final) cluster, and the method 300 may end (e.g., in accordance with steps 310 and 324). If, however, all points remaining in the list do not have the same height, then the processing system may repeat steps 312-322, this time selecting a second point (instead of the first point) to add to a second cluster (instead of the first cluster).

Thus, the method 300 may iterate though steps 308-322 until all points in the list have been evaluated for inclusion in a cluster. These iterations may result in a plurality of clusters (e.g., including the first cluster, the second cluster, and potentially additional clusters), where each cluster may define a three-dimensional polyhedron (e.g., a prism or a truncated prism) as discussed above in connection with FIG. 2.

As discussed above, some parameters of the clustering process may be configurable. For instance, the predefined threshold difference between the minimum and maximum heights in a cluster and the predefined threshold distance between neighbor points may be configured by a user. In further examples, additional parameters may also be configurable. For instance, in one example, the bounding box of the processed area, i.e., the boundaries in the (x,y) plane of the building footprint, may be configurable by the user. Allowing the user to set the bounding box may allow a large area to be partitioned into multiple smaller areas, which may increase scalability by providing multiple smaller areas that can be processed in parallel. In another example, the minimum size of (e.g., minimum number of points in) the clusters may also be configurable by the user. For instance, polygonal areas that are too small (i.e., smaller than the minimum size) may be discarded or ignored to prevent noise or partitioning of a building into many tiny fragments. Depending on the objective for which the 3D models are generated, the parameters may vary. For instance, for some objectives, a five centimeter threshold difference between the minimum and maximum heights in a cluster may be insignificant, whereas a five meter difference may be very significant. In one example, any one or more of these parameters may be configured based on the needs of a 5G infrastructure planning process. For instance, the predefined threshold distance between the minimum and maximum heights in a cluster may be set so that any height differences within the cluster do not cause interference with electromagnetic millimeter wave transmissions.

Figure 4:
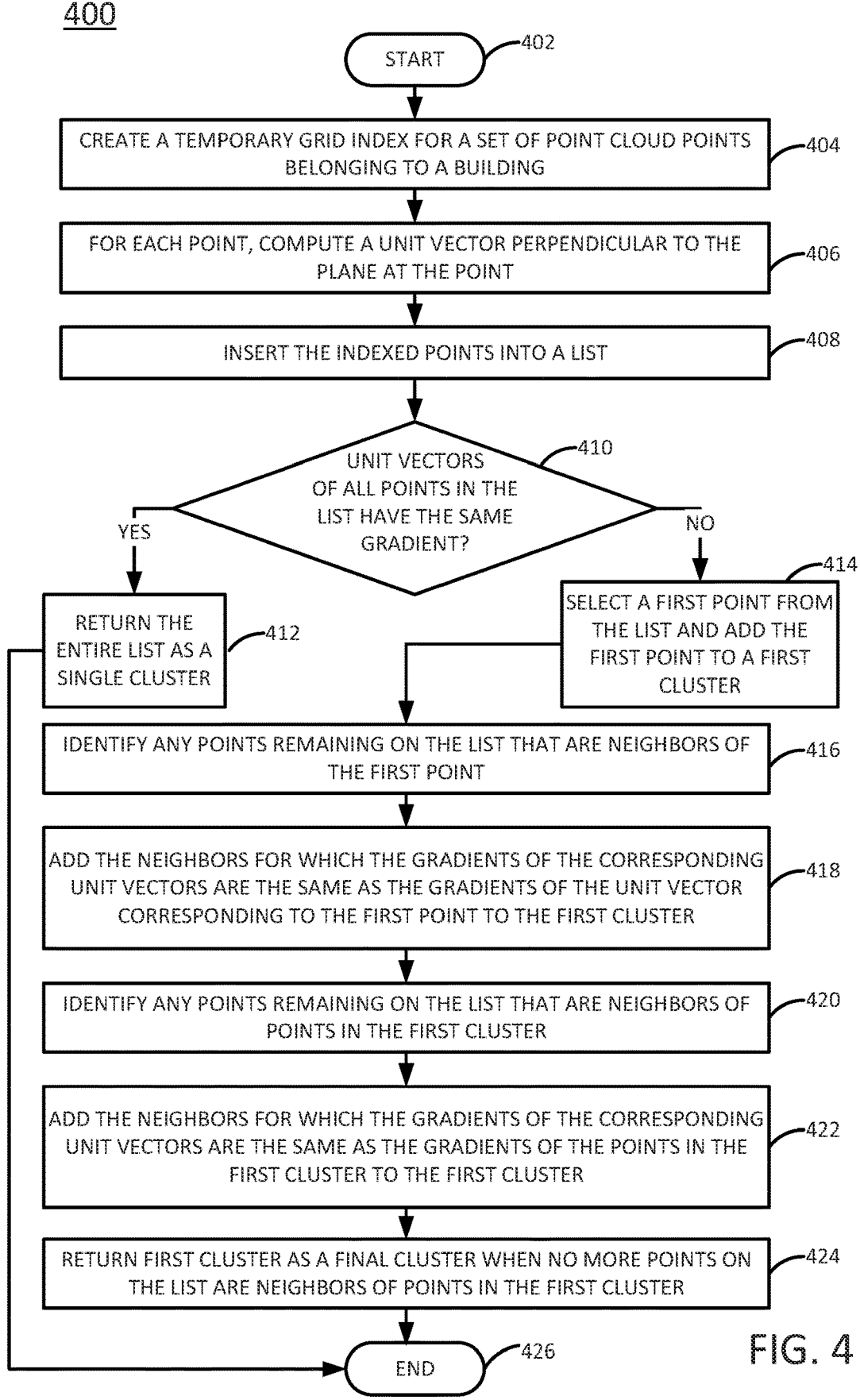
FIG. 4 illustrates a flowchart of an example method for performing gradient-based clustering of points of a LiDAR point cloud, in accordance with the present disclosure.

FIG. 4 illustrates a flowchart of an example method 400 for performing gradient-based clustering of points of a LiDAR point cloud, in accordance with the present disclosure. For instance, the method 400 may be performed in accordance with step 210 of the method 200, described above. In one example, the method 400 is performed by a component of the system 100 of FIG. 1, such as by the AS 104, and/or any one or more components thereof (e.g., a processor, or processors, performing operations stored in and loaded from a memory), or by the AS 104 in conjunction with one or more other devices, such as server 106, edge server 108, and so on. In one example, the steps, functions, or operations of method 400 may be performed by a computing device or system 700, and/or processor 702 as described in connection with FIG. 7 below. For instance, the computing device or system 700 may represent any one or more components of the system 100 of FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 600 may collectively function as a processing system. For illustrative purposes, the method 400 is described in greater detail below in connection with an example performed by a processing system.

The method 400 begins in step 402 and may proceed to step 404. In step 404, the processing system may create a temporary grid index for a set of points belonging to a building. The temporary grid index may be created in a single pass over the set of points to create a plurality of indexed points, and the grid index may allow the neighbors of a given point to be retrieved in constant time (i.e., with O(1) time complexity), as discussed in further detail below.

Figure 5:
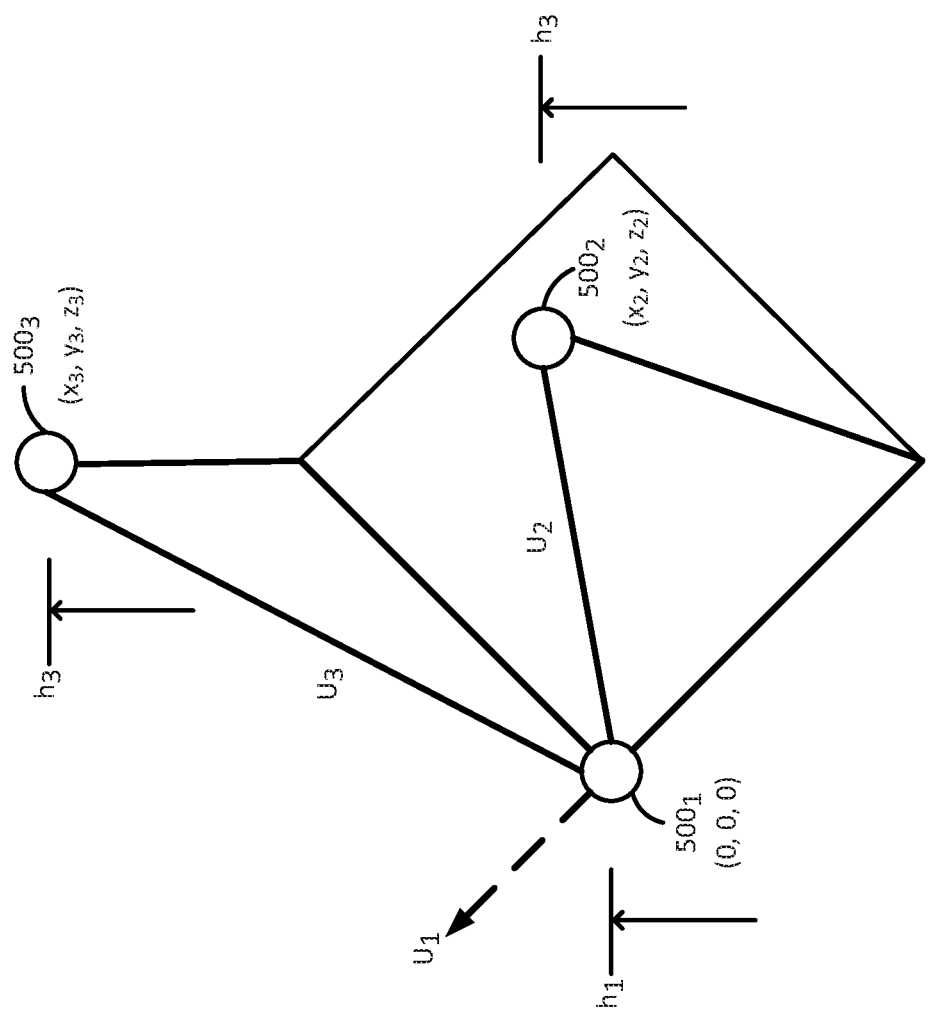
FIG. 5 is a diagram illustrating the computation of a unit vector for a first point of a point cloud.

In step 406, the processing system may compute, for each point in the grid index, a unit vector perpendicular to the plane at that point. In one example, the unit vector perpendicular to the plane at a given point may be computed based on the perpendicular vectors to neighboring points of the given point. FIG. 5, for example, is a diagram illustrating the computation of a unit vector for a first point $500_1$ of a point cloud. In the illustrated example, the first point $500_1$ may have as neighbors a second point $500_2$ and a third point $500_3$ (the points $500_1$-$500_3$ may hereinafter be referred to individually as a "point 500" or collectively as "points 500").

From the digital surface model, the respective heights $h_1$, $h_2$, and $h_3$ of the points $500_1$, $500_2$, and $500_3$ are known. The distance between the projections of any pair of the points 500 on the Earth's surface may be defined as d. If the first point $500_1$ is defined as the origin of the axes (i.e., with (x,y,z) coordinates of (0,0,0)), then the vector $v_2=(x_2, y_2, z_2)$ to the second point $500_2$ is (0, d, $h_2$−$h_1$). Similarly, the vector $v_3=(x_3, y_3, z_3)$ to the third point $500_3$ is (d, 0, $h_3$−$h_1$).

The unit vectors can be computed by normalizing the vectors $v_2$ and $v_3$, such that:

$$\vec{u_i} = \frac{\vec{v_i}}{\|v_i\|} \quad \text{(EQN. 1)}$$

for $i \in \{1, 2\}$

Then, the unit vector perpendicular to the plane at the first point $500_1$ is $u_1 = u_2 \times u_3$. In other words, the unit vector $u_1$ is computed based on the cross product of the unit vectors representing the slope of the surface (horizontally and vertically) at the first point $500_1$, i.e., the unit vectors $u_2$ and $u_3$.

In step 408, the processing system may insert the indexed points into a list. In one example, the points may be sorted in the list according to the gradients of their unit vectors (i.e., angles with respect to a line that is perpendicular to the surface of the Earth). For instance, the points may be listed in ascending order according to gradient (e.g., from a smallest gradient to a largest gradient) or in descending order according to gradient (e.g., from the largest gradient to the smallest gradient).

In step 410, the processing system may determine whether the unit vectors associated with all of the points in the list have the same gradient. In one example, the unit vectors associated with all of the points in the list may be considered to have the same gradient if the difference between the largest gradient and the smallest gradient is below a predefined threshold. In one example, the predefined threshold may be configurable by the user. Too small a value for the predefined threshold may result in the partitioning of a building into fragments that are too small to process efficiently, whereas too large a value may not adequately distinguish between facets of the building and other portions of the building. In one example, the predefined threshold is set equal to the point cloud resolution (i.e., the distance between adjacent points in the point cloud) as a default.

If the processing system determines in step 410 that the unit vectors associated with all of the points in the list have the same gradient, then the method 400 may proceed to step 412, where the processing system may return the entire list of points as a single cluster. The method may then end in step 426.

Alternatively, if the processing system determines in step 410 that the unit vectors associated with all of the points on the list do not have the same gradient, then the method 400 may proceed to step 414. In step 414, the processing system may select a first point from the list and add the first point to a first cluster.

In step 416, the processing system may return to the list and identify any other points remaining in the list that are neighbors of the first point. In one example, a point is a neighbor of the first point if the latitudinal and longitudinal (x,y) coordinates of the point are within a predefined threshold distance of the (x,y) coordinates of the first point. In one example, the predefined threshold distance is configurable by a user. If the predefined threshold distance is too small, then the clustering may be too sensitive to noise (e.g., clusters may end up being partitioned by small barriers or bumps). However, if the predefined threshold distance is too large, then the computational cost of the subsequent steps of the method 400 may be too great, and clusters that are too far away from each other may be inadvertently connected.

In step 418, the processing system may add those neighbors of the first point whose associated unit vectors have the same gradient (or have a gradient that is within a predefined threshold of, where the predefined threshold may be the same as the predefined threshold used in step 410) as the unit vector associated with the first point to the first cluster. The points added to the cluster in step 418 may be referred to as a first set of additional points, In step 420, the processing system may return to the list and identify any other points remaining in the list that are neighbors of points in the first clusters.

In step 422, the processing system may add those neighbors of points in the first cluster whose associated unit vectors have the same gradient (or have a gradient that is within the predefined threshold of) the unit vectors associated with the points in the first cluster to the first cluster. The points added to the cluster in step 422 may be referred to as a subsequent set of additional points. In one example, steps 420 and 422 may be performed iteratively. That is, each time new points are added to the first cluster, any points remaining in the list that are neighbors of the new points may be evaluated for possible addition to the first cluster.

Once all neighbors of points in the first cluster have been evaluated for inclusion in the first cluster (and either added to the first cluster if a neighbor whose unit vector has the same gradient as the unit vector(s) associated with the point(s) in the first cluster or not added to the first cluster if not a neighbor whose unit vector has the same gradient as the unit vector(s) associated with the point(s) in the first cluster), the processing system may return the first cluster as a final cluster in step 424.

The method 400 may then return to step 410, and repeat steps 410-422 as necessary. For instance, if the unit vectors associated with all points remaining in the list now have the same gradient, then the list may be returned as a second (final) cluster, and the method 400 may end (e.g., in accordance with steps 412 and 426). If, however, the unit vectors associated with all points remaining in the list do not have the same gradient, then the processing system may repeat steps 414-422, this time selecting a second point (instead of the first point) to add to a second cluster (instead of the first cluster).

Thus, the method 400 may iterate though steps 410-424 until all points in the list have been evaluated for inclusion in a cluster. These iterations may result in a plurality of clusters (e.g., including the first cluster, the second cluster, and potentially additional clusters), where each cluster may define a three-dimensional polyhedron (e.g., a prism or a truncated prism) as discussed above in connection with FIG. 2.

It should be noted that the methods 200, 300, and 400 may be expanded to include additional steps, or may be modified to replace steps with different steps, to combine steps, to omit steps, to perform steps in a different order, and so forth. For instance, as discussed above, in one example the processor may repeat one or more steps of the method 200 or 300, such as steps 308-316 of the method 300, steps 312-318 of the method 300, etc. In another example, the method 200, 300, or 400 may include storing one or more digital objects, e.g., in a database or at the edge server. Thus, these and other modifications are all contemplated within the scope of the present disclosure.

In addition, although not expressly specified above, one or more steps of the method 200, 300, or 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2-4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 7 depicts a high-level block diagram of a computing device or processing system specifically programmed to perform the functions described herein. For example, any one or more components or devices illustrated in FIG. 1, or described in connection with the methods 200, 300, or 400 of FIG. 2, 3, or 4 may be implemented as the processing system 700. As depicted in FIG. 7, the processing system 700 comprises one or more hardware processor elements 702 (e.g., a microprocessor, a central processing unit (CPU) and the like), a memory 704, (e.g., random access memory (RAM), read only memory (ROM), a disk drive, an optical drive, a magnetic drive, and/or a Universal Serial Bus (USB) drive), a module 705 for constructing compact three-dimensional models of buildings, and various input/output devices 706, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 702 can also be configured or programmed to cause other devices to perform one or more operations as discussed above. In other words, the hardware processor 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), a graphics processing unit (GPU), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 705 for constructing compact three-dimensional models of buildings (e.g., a software program comprising computer-executable instructions) can be loaded into memory 704 and executed by hardware processor element 702 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for constructing compact three-dimensional models of buildings (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:
obtaining, by a processing system including at least one processor, a light detection and ranging point cloud of a building, wherein the light detection and ranging point cloud comprises a plurality of points, and wherein each point in the plurality of points is associated with a set of (x,y,z) coordinates;
assigning, by the processing system, a first point of the plurality of points to a subset of the plurality of points that is associated with the building, wherein the subset comprises points whose (x,y) coordinates fall within a footprint of the building;
grouping, by the processing system, the first point into a first cluster according to at least one of: a (z) coordinate of the first point or a gradient to which the first point belongs;
constructing, by the processing system, a first prism formed by the first cluster, wherein the constructing comprises:
computing, by the processing system, a convex hull of the first cluster, wherein the convex hull comprises the first prism; and
intersecting, by the processing system, the convex hull with the footprint of the building; and
storing, by the processing system, a model of the building as a plurality of connected prisms, wherein the plurality of connected prisms includes the first prism.

2. The method of claim 1, wherein the footprint of the building comprises a polygon extracted from a satellite image of the building.

3. The method of claim 2, wherein the footprint of the building is obtained from an existing dataset of building footprints.

4. The method of claim 1, wherein the (x,y) coordinates define a latitudinal and longitudinal position of the first point, and the (z) coordinates define elevations above sea level.

5. The method of claim 1, wherein the first cluster comprises a further subset of the subset, and wherein differences in (z) coordinates of points in the further subset all fall below a predefined threshold difference.

6. The method of claim 5, wherein the grouping comprises:
creating, by the processing system, a temporary grid index of the subset of the plurality of points, to produce a plurality of indexed points;
inserting, by the processing system, the plurality of indexed points into a list, wherein the list sorts the plurality of indexed points according to the (z) coordinates; and
determining, by the processing system and based on the list, that the first point belongs to the first cluster.

7. The method of claim 6, wherein the determining comprises:
calculating, by the processing system, that a difference between a minimum (z) coordinate of the (z) coordinates and a maximum (z) coordinate of the (z) coordinates is below a predefined threshold; and
grouping, by the processing system, all points in the plurality of indexed points into the first cluster in response to the calculating.

8. The method of claim 7, wherein the predefined threshold is equal to a resolution of the light detection and ranging point cloud.

9. The method of claim 6, wherein the determining comprises:
calculating, by the processing system, that a difference between a minimum (z) coordinate of the (z) coordinates and a maximum (z) coordinate of the (z) coordinates is above a predefined threshold;
adding, by the processing system, the first point to the first cluster;
adding, by the processing system, a first set of additional points of the plurality of indexed points to the first cluster, wherein each point in the first set of additional points is a neighbor of the first point, and wherein a difference between a (z) coordinate of each additional point of the first set of additional points and the z coordinate of the first point is below the predefined threshold;
iteratively adding, by the processing system, subsequent sets of additional points of the plurality of indexed points to the first cluster, wherein each point in the subsequent sets of additional points is a neighbor of a point that is already in the first cluster, and wherein a difference between a (z) coordinate of each additional point of the subsequent sets of additional points and the z coordinate of the point that is already in the first cluster is below the predefined threshold; and
returning, by the processing system, the first cluster as a final cluster when the iteratively adding is completed.

10. The method of claim 9, wherein the iteratively adding is completed when there are no points remaining in the plurality of indexed points that are neighbors of any point that is already in the first cluster and for which the difference between the (z) coordinate and the (z) coordinate of the any point falls below the predefined threshold.

11. The method of claim 1, wherein the first cluster comprises a further subset of the subset, and wherein differences in gradients of unit vectors associated with points in the further subset all fall below a predefined threshold difference.

12. The method of claim 11, wherein the grouping comprises:
creating, by the processing system, a temporary grid index of the subset of the plurality of points, to produce a plurality of indexed points;
computing, by the processing system and for each point of the plurality of indexed points, a unit vector perpendicular to a plane of each point, to produce a plurality of unit vectors; and
determining, by the processing system and based on a unit vector of the plurality of unit vectors corresponding to the first point, that the first point belongs to the first cluster.

13. The method of claim 12, wherein the determining comprises:
calculating, by the processing system, that a difference between a smallest gradient among the plurality of unit vectors and a largest gradient among the plurality of unit vectors is below a predefined threshold; and
grouping, by the processing system, all points in the plurality of indexed points into the first cluster in response to the calculating.

14. The method of claim 13, wherein the predefined threshold is equal to a resolution of the light detection and ranging point cloud.

15. The method of claim 12, wherein the determining comprises:
calculating, by the processing system, that a difference between a smallest gradient among the plurality of unit vectors and a largest gradient among the plurality of unit vectors is above a predefined threshold;

adding, by the processing system, the first point to a preliminary cluster;

adding, by the processing system, a first set of additional points of the plurality of indexed points to the first cluster, wherein each point in the first set of additional points is a neighbor of the first point, and wherein a difference between a gradient of the unit vector associated with each additional point of the first set of additional points and a gradient of the unit vector associated with the first point is below the predefined threshold;

iteratively adding, by the processing system, subsequent sets of additional points of the plurality of indexed points to the first cluster, wherein each point in the subsequent sets of additional points is a neighbor of a point that is already in the first cluster, and wherein a difference between a gradient of a unit vector associated with each additional point of the subsequent sets of additional points and the gradient of the unit vector associated with the point that is already in the first cluster is below the predefined threshold; and returning, by the processing system, the first cluster as a final cluster when the iteratively adding is completed.

16. The method of claim 15, wherein the iteratively adding is completed when there are no points remaining in the plurality of indexed points that are neighbors of any point that is already in the first cluster and for which the difference between the gradient of the unit vector and the gradient of the unit vector associated with the any point falls below the predefined threshold.

17. The method of claim 1, wherein the processing system is part of a relational database management system.

18. A device comprising:
a processor; and
a computer-readable medium storing instructions which, when executed by the processor, cause the processor to perform operations, the operations comprising:
obtaining a light detection and ranging point cloud of a building, wherein the light detection and ranging point cloud comprises a plurality of points, and wherein each point in the plurality of points is associated with a set of (x,y,z) coordinates;
assigning a first point of the plurality of points to a subset of the plurality of points that is associated with the building, wherein the subset comprises points whose (x,y) coordinates fall within a footprint of the building;
grouping the first point into a first cluster according to at least one of: a (z) coordinate of the first point or a gradient to which the first point belongs;
constructing a first prism formed by the first cluster, wherein the constructing comprises:
computing a convex hull of the first cluster, wherein the convex hull comprises the first prism; and
intersecting the convex hull with the footprint of the building; and
storing a model of the building as a plurality of connected prisms, wherein the plurality of connected prisms includes the first prism.

19. A non-transitory computer-readable medium storing instructions which, when executed by a processing system including at least one processor, cause the processing system to perform operations, the operations comprising:
obtaining a light detection and ranging point cloud of a building, wherein the light detection and ranging point cloud comprises a plurality of points, and wherein each point in the plurality of points is associated with a set of (x,y,z) coordinates;
assigning a first point of the plurality of points to a subset of the plurality of points that is associated with the building, wherein the subset comprises points whose (x,y) coordinates fall within a footprint of the building;
grouping the first point into a first cluster according to at least one of: a (z) coordinate of the first point or a gradient to which the first point belongs;
constructing a first prism formed by the first cluster, wherein the constructing comprises:
computing a convex hull of the first cluster, wherein the convex hull comprises the first prism; and
intersecting the convex hull with the footprint of the building; and
storing a model of the building as a plurality of connected prisms, wherein the plurality of connected prisms includes the first prism.

20. The non-transitory computer-readable medium of claim 19, wherein the first cluster comprises a further subset of the subset, and wherein differences in (z) coordinates of points in the further subset all fall below a predefined threshold difference.

* * * * *